(12) United States Patent
Wagoner (10) Patent No.: US 8,358,033 B2
(45) Date of Patent: Jan. 22, 2013

(54) SYSTEMS, METHODS, AND APPARATUS FOR CONVERTING DC POWER TO AC POWER

(75) Inventor: Robert Gregory Wagoner, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/505,858

(22) Filed: Jul. 20, 2009

(65) Prior Publication Data

US 2010/0277001 A1 Nov. 4, 2010

(51) Int. Cl.
*H02J 1/00* (2006.01)
(52) U.S. Cl. ........................................................ 307/82
(58) Field of Classification Search .................. 307/82
See application file for complete search history.

(56) References Cited

U.S. PATENT DOCUMENTS

| | | |
|---|---|---|
| 4,390,940 A | 6/1983 | Corbefin et al. |
| 6,058,035 A | 5/2000 | Madenokouji et al. |
| 6,262,558 B1 | 7/2001 | Weinberg |
| 6,291,764 B1 | 9/2001 | Ishida et al. |
| 6,323,626 B1 | 11/2001 | Raiser |
| 6,369,461 B1 | 4/2002 | Jungreis et al. |
| 6,809,942 B2 | 10/2004 | Madenokouji et al. |
| 6,921,985 B2 | 7/2005 | Janssen et al. |
| 6,952,353 B2 | 10/2005 | Yan et al. |
| 7,016,205 B2 | 3/2006 | Steigerwald et al. |
| 2004/0125618 A1 | 7/2004 | De Rooij |
| 2005/0105224 A1 | 5/2005 | Nishi |
| 2005/0284673 A1* | 12/2005 | Nakazawa et al. ........... 180/65.1 |
| 2007/0164612 A1 | 7/2007 | Wendt |
| 2008/0007121 A1 | 1/2008 | Erdman et al. |
| 2008/0036432 A1* | 2/2008 | Takada et al. ................. 323/234 |
| 2008/0062724 A1* | 3/2008 | Feng et al. ...................... 363/17 |
| 2009/0236917 A1* | 9/2009 | Bettenwort et al. ............ 307/82 |

FOREIGN PATENT DOCUMENTS

EP 947904 B1 10/2003

OTHER PUBLICATIONS

DC to DC Converter, Wikipedia: The Free Encyclopedia, Jun. 2, 2009, <http://en.wikipedia.org/wiki/DC_to_DC_converter>.

(Continued)

*Primary Examiner* — Rexford Barnie
*Assistant Examiner* — Dru Parries
(74) *Attorney, Agent, or Firm* — Sutherland Asbill & Brennan LLP (57) ABSTRACT

Embodiments of the invention can provide systems, methods, and an apparatus for converting direct current (DC) power to alternating current (AC) power. According to one embodiment, a system for converting DC power to AC power can be provided. The system can include a DC power source electrically coupled to a DC-to-DC converter. The DC power source can be associated with a first ground, and the DC-to-DC converter can be operable to isolate the power provided by the DC power source from the first ground. The DC-to-DC converter can be further operable to condition the DC power and to provide the conditioned DC power to an inverter. The inverter can receive the conditioned DC power and can convert the conditioned DC power to AC power. The AC power can be associated with a second ground and can be provided to at least one load electrically coupled to the inverter.

18 Claims, 4 Drawing Sheets

OTHER PUBLICATIONS

Cullen, R., What is Maximum Power Point Tracking (MPPT) and How Does It Work?, Blue Sky Energy, Inc., <www.blueskyenergyinc.com>.

Disclosure Statement Under 37 C.F.R. §1.56 as filed Jul. 24, 2009.
European Search Report for European Application No. 2010169390 dated Oct. 13, 2010.

* cited by examiner

SYSTEMS, METHODS, AND APPARATUS FOR CONVERTING DC POWER TO AC POWER

FIELD OF THE INVENTION

The invention relates to power conversion, and more specifically, to systems, methods, and an apparatus for converting direct current (DC) power to alternating current (AC) power.

BACKGROUND OF THE INVENTION

A direct current (DC) power source, such as a fuel cell or photovoltaic cell, typically produces a low voltage at a high current. While these DC power sources provide a source of power, the power can be inconsistent, varying with local operating conditions. For example, in the case of a photovoltaic cell, the power output can vary according to the amount of direct sunlight available at the face of the cell and the physical condition of the cell. Many power applications require a more stable source of power than these DC power sources can provide. Moreover, many power applications require alternating current (AC) power and not DC power to operate. Thus, it is generally necessary to convert the variable DC power provided by the DC power source to a stable source of AC power. Conventional systems have been adapted for such power conversion, but conventional systems can be costly and inefficient.

For example, solar arrays comprise many photovoltaic cells and are often spread across many acres of land. To harness the power provided by these large arrays and to provide this power to a power converter, conventional systems rely on various gauges of wiring, oftentimes in relatively great lengths. This wiring can be relatively bulky and expensive, making implementation costly and cumbersome. At the same time, in relying on large solar arrays coupled to one or only a few power converters, conventional systems can not accommodate for failures or fluctuations in individual cells. That is, because individual cells or arrays can not be adjusted individually to their maximum power point, when one cell fails, the total power output of the conventional system diminishes.

Thus, there is a need to efficiently provide DC power from a DC power source to a load, such as a utility power grid. More specifically, there is a need for systems, methods, and an apparatus to convert DC power to AC power.

BRIEF DESCRIPTION OF THE INVENTION

Certain embodiments of the invention can address some or all of the needs described above. Certain embodiments of the invention are directed to systems, methods, and an apparatus for converting direct current (DC) power to alternating current (AC) power. According to one embodiment, a method for converting DC power to AC power can be provided. The method can begin with providing DC power from at least one DC power source, wherein the DC power source can be associated with a first ground. The method can continue with conditioning the DC power provided by the DC power source and isolating the conditioned DC power from the first ground. The method can proceed by converting the conditioned DC power to AC power so that the AC power, being isolated from the first ground, can be referenced to a second ground. The method can also include providing the converted AC power to at least one load.

According to another embodiment of the invention, a system for converting DC power to AC power can be provided. The system can include at least one DC power source associated with a first ground electrically coupled to at least one DC-to-DC converter. The DC-to-DC converter can be operable to condition the DC power provided by the DC power source and to isolate the conditioned DC power from the first ground. The system can also include at least one inverter electrically coupled to the DC-to-DC converter. The inverter can be operable to convert the conditioned DC power to AC power, wherein the converted AC power can be associated with a second ground. The system can also include at least one load for receiving the converted AC power.

According to yet another embodiment of the invention, an apparatus for converting DC power to AC power can be provided. The apparatus can include a DC-to-DC converter electrically coupled to a source of DC power and operable to condition the DC power provided by the source of DC power and to isolate the conditioned DC power from a first ground associated with the source of DC power. The apparatus can also include an inverter electrically coupled to the DC-to-DC converter. The inverter can be operable to convert the DC power provided by the DC-to-DC converter to AC power associated with a second ground.

Other embodiments and aspects of the invention will become apparent from the following description taken in conjunction with the following drawings.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will convey the scope of the invention to those skilled in the art. Like numbers refer to like elements throughout.

Figure 1:
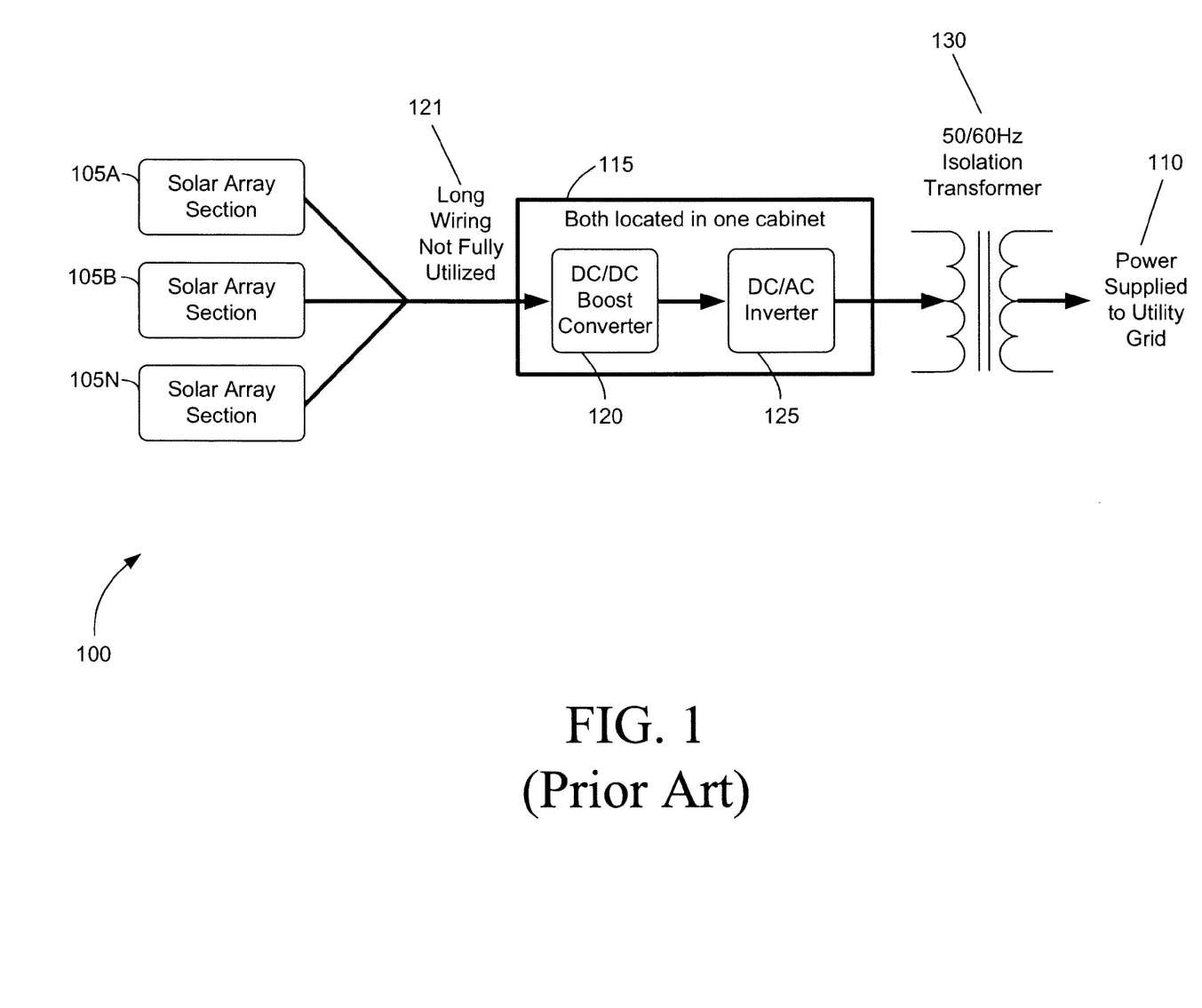
FIG. 1 illustrates a conventional system for converting direct current (DC) power to alternating current (AC) power.

FIG. 1 illustrates a conventional DC-to-AC power conversion system 100 for converting direct current (DC) power to alternating current (AC) power. In conventional power conversion system 100, one or more solar array sections 105A-N can provide a source of DC power. The solar array sections 105A-N can be a linked collection of photovoltaic cells, which convert solar energy into DC power via a photovoltaic effect. Because the power produced by any individual cell is relatively low, photovoltaic cells can be linked together in series and/or parallel combinations to form an array so that the power from individual photovoltaic cells can be combined.

Although photovoltaic cells, and fuel cells for that matter, can tap into an almost inexhaustible source of energy, such DC power sources do have shortcomings. One shortcoming is that the DC power output of such cells can be influenced by local conditions—such as temperature and the condition of the cells—making their power output variable. A second shortcoming is that photovoltaic cells and fuel cells provide a source of DC power, whereas most electric power loads require alternating current (AC) type power, meaning that DC power sources can not be directly connected to utility power grid 110 for general power purposes. The combination of their variable power output and the fact that their power output is DC-type power means that to incorporate DC power sources, like photovoltaic cells and fuel cells, into the utility power grid 110 illustrated in FIG. 1, their DC power outputs must be converted, such as by electrically coupling the solar array sections 105A-N to a power converter such as power converter 115.

Power converter 115 can convert the electrical energy from a DC power source, such as solar array sections 105A-N, to a relatively stable and reliable AC power source. Power converter system 115 can include DC-to-DC converter 120. DC-to-DC converter 120 is electrically coupled to solar array sections 105A-N in parallel and operable to condition the DC power provided from these sources to make the DC power more stable.

Because the DC-to-DC converter 120 provides regulated DC power, but not AC power, an inverter can convert the regulated DC power to AC power. To this end, power converter system 115 can include a DC-to-AC inverter 125 to convert the regulated DC power produced by DC-to-DC converter 120 into AC power, such as a 60 Hz sinusoidal current waveform, which can be provided to the utility grid 110.

Interfacing power converter system 115 with utility power grid 110 can require an isolation transformer 130. Isolation transformer 130 isolates solar array sections 105A-N, which are referenced to a first ground like an earth ground, from the utility power grid 110, which can be referenced to a second ground and not common with the first ground. In conventional system 100, a relatively low frequency isolation transformer 150 is electrically connected between the DC-to-AC inverter 125 and a designated load, such as utility power grid 110. Such low frequency transformers like isolation transformer 130 can be quite costly and relatively large in size. Thus, in conventional system 100, a large physical footprint is required and significant costs must be incurred to implement the system.

In addition, other costs are associated with conventional system 100. For example, DC-to-DC converter 120 can be electrically coupled with multiple solar arrays 105A-N in parallel. In making this parallel electrical combination, the DC power provided by any one solar array section 105A can be combined with the DC power provided by other solar array sections 105B-N. This parallel connection can be made with various gauges of electrical wiring 121. In the conventional system, relatively small wiring, such as wiring used to conduct about 1 amp to about 10 amps of current, can electrically couple the farthest solar array to the next closest array. As solar arrays 105A-N are combined, the wire required to couple the multiple solar arrays 105A-N must be of a larger and larger gauge to accommodate the increased current supply. At the connection of the multiple solar arrays 105A-N to DC-to-DC converter 120, electrical wiring 121 can comprise 100 amps and even 1000 amps capacities.

In conventional systems, the relatively large physical footprint of DC-to-DC converter 120 results in DC-to-DC converter 120 being located remotely from solar arrays 105A-N.

In making this remote electrical connection, a substantial length of wiring may be required. In addition, to accommodate the parallel electrical combination of solar arrays 105A-N, a large amount of wiring of various gauges can be required, which can increase the costs associated with wiring 121. Furthermore, because multiple solar arrays 105A-N are electrically coupled to one or only a few power converters 115, it can be relatively difficult to operate or adjust the power output of any single array 105A. When one solar array section such as 105A fails, the power output of conventional system 100 can suffer because the solar array sections 105A-N can not be operated independently of each other. It is sometimes desirable to reduce these costs and inefficiencies associated with conventional system 100.

Figure 2:
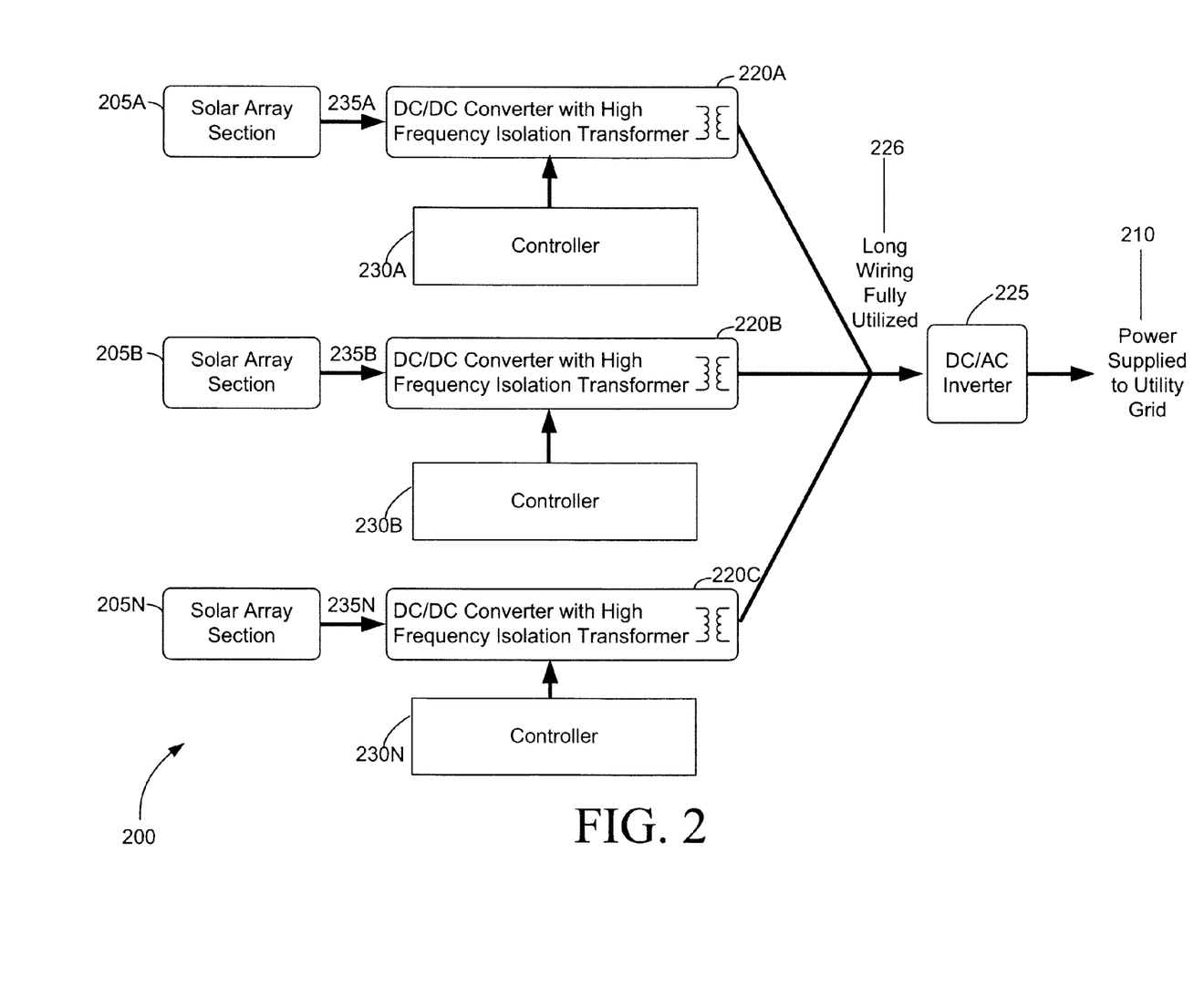
FIG. 2 illustrates a exemplary system and apparatus for converting DC power to AC power according to one embodiment of the invention.

FIG. 2 illustrates an exemplary system 200 and apparatus for converting DC power to AC power according to one embodiment of the invention. As in conventional system 100, exemplary power supply system 200 can include a DC power sources 205A-N, such as a photovoltaic cell, a fuel cell, an array of such cells, a battery, or the like. In the exemplary embodiment, the DC power source can be one or more solar array sections 205A-N similar to 105A-N in FIG. 1. Also like conventional system 100, exemplary power supply system 200 can electrically couple solar array sections 205A-N to a load, such as by incorporation into the utility power grid 220. Unlike the conventional system 100, though, exemplary power supply system 200 can reduce the need for the relatively large low frequency isolation transformer 130 of FIG. 1 by replacing the low frequency isolation transformer 130 with an isolation transformer in each converter, as shown at 220A.

In the exemplary embodiment, an apparatus such as converter 220A can condition the DC power provided by solar array section 205A and isolate the DC power solar array section 205A provides, which can be referenced to a first ground such as an earth ground, from the utility power grid 210, which can be referenced to a second ground, such as an AC ground. In conditioning the DC power provided by solar array section 205A, converter 220A can stabilize the DC power being provided. In one embodiment, converter 220A can include the use of a switching type regulator that can regulate the DC voltage at some level using a form of pulse width modulation control. In another embodiment, converter 220A can include a boost converter, or step up converter, that is operable to boost the DC power provided by solar array section 205A from a first voltage to a second voltage. For example, in one embodiment, converter 220A can be operable to receive an unstable 300 Volt DC power signal from solar array section 205A, to condition the unstable signal so that it can be a 300 Volt regulated DC power signal, and to boost the 300 Volt regulated DC power signal to a 600 Volt regulated DC power signal at the output of converter 205.

In some embodiments, the isolation transformer within converter 220A can be adapted to operate at high frequencies. By adapting the isolation transformer within converter 220A to operate at high frequencies, relatively smaller and lower cost components can be used, which is at least one technical effect of the invention. More specifically, because a transformer's cost and weight can be inversely proportional to the operating frequency of the transformer, for a given output power, increasing the operating frequency can result in a relatively smaller transformer. For example, a transformer designed for about 400 Hz may be roughly five times smaller in volume, cost, and weight when compared to an isolation transformer with similar power rating that operates at 50/60 Hz.

In one aspect of the embodiment shown in FIG. 2, an apparatus such as converter 220A can include the use of a switching type regulator operating at approximately 3 kHz. When adapting an isolation transformer to be part of converter 220A, the isolation transformer can be scaled to operate at approximately 3 kHz as well. Scaling the isolation transformer in this way means that the size and cost of the 3 kHz isolation transformer within converter 220A may be a relatively small fraction of the size and cost of the 50/60 Hz isolation transformer 130 in FIG. 1. In other embodiments of the apparatus such as converter 220A, the isolation transformer to be part of converter 220A can be scaled to operate at a frequency in the range of approximately 50 Hz to 500 kHz.

Because converter 220A and its associated isolation transformer can accommodate relatively smaller components by operating at high frequencies, converter 220A can maintain a relatively smaller physical footprint. Thus, in the exemplary embodiment, converter 220A can be relocated to be physically nearer to an associated solar array section such as 205A. For example, in embodiments where the DC power source comprises a solar array physically located across a relatively broad expanse of real estate, multiple converters 220A-N can be used and adapted to electrically couple to individual cells or portions of the solar array. Converters 220A-N can then be electrically coupled in parallel to DC-to-AC inverter 225 via wiring 226.

In embodiments where multiple converters 220A-N are used and where each converter 220 is electrically connected to a DC power source like solar array sections 205A-N, the flexibility and total power output of system 200 can be improved. In the exemplary embodiment, three converters 220A, 220B, and 220N are illustrated as being electrically connected in series with a solar array sections 205A, 205B, and 205N, and electrically connected in parallel with DC-to-AC inverter 225. It will be appreciated that in other embodiments, more converters 220A-N and solar arrays 205A-N can be used. In any event, using multiple converters 220A-N electrically coupled to solar array sections 205A-N and in parallel with DC-to-AC inverter 225 can enable the relatively quick repair of the total solar array. For instance, if solar array section 205A fails, only the parallel branch of system 200 associated with the failed section need be deactivated for repair. In conventional system 100, when one solar array section 105A fails, the whole solar array comprising multiple solar array sections 105A-N requires deactivation for repair since the whole solar array is electrically coupled in parallel with power converter 115.

Furthermore, using multiple apparatuses such as converters 220A-N can allow for Maximum Power Point Tracking ("MPPT") to be performed independently for each DC power source in system 200. MPPT corresponds to operating a DC power source at its maximum power transfer point. In the exemplary system 200, using MPPT on solar array sections 205A-N, which can be part of a much larger solar array, can allow for optimization of the available solar energy from the larger solar array as a whole, such as through compensation for shadowing or for weak or broken sections of the array.

Figure 3:
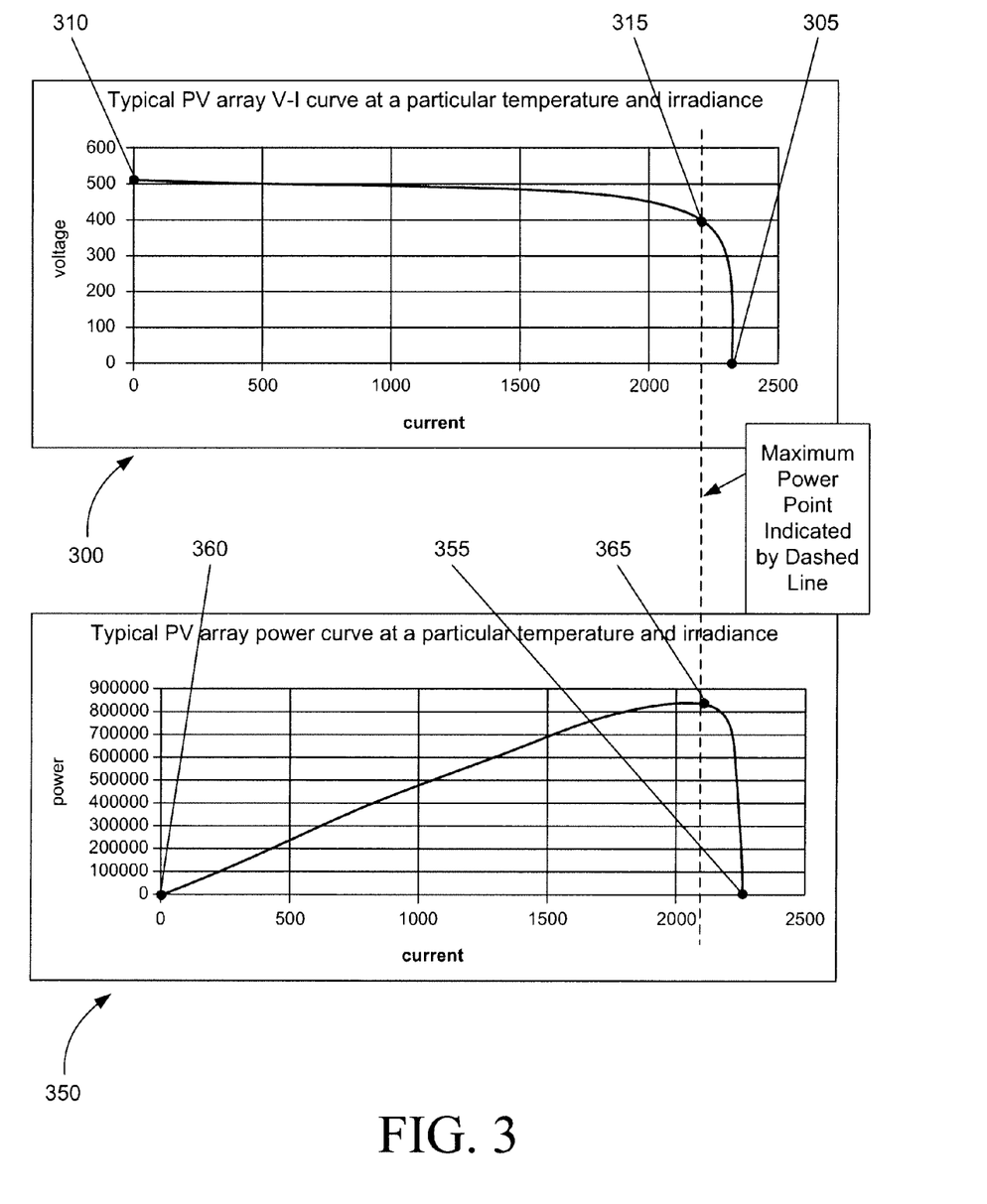
FIG. 3 illustrates a chart displaying an exemplary maximum power point for a DC power source according to one embodiment of the invention.

In the embodiment shown in FIG. 2, the voltage, current, and power produced by various DC power sources, such as the solar array sections 205A-N, can vary according to ambient conditions. The electrical response of DC power sources can also depend on the electrical impedance of the load electrically coupled to the DC power source. This variability is illustrated in FIG. 3, where exemplary charts 300 and 350 are illustrated for solar array section 105.

Chart 300 illustrates an exemplary current-voltage (I-V) curve for solar array section 205A at a particular radiance and operating temperature. Chart 350 illustrates a corresponding current-power (I-P) chart. As shown at 305, solar array section 205A produces its maximum current when there is no resistance in the circuit, that is, when the load comprises zero impedance. At 305, the voltage provided by solar array section 205A is zero, as is solar array section 205A's DC power output at 355. Conversely, as shown at 310, solar array section 205A produces its maximum voltage when there is infinite resistance in the circuit, that is, when the load comprises a very large impedance. At 310, the current provided by solar array section 205A is zero, as is the DC power output at 360.

Between these two extremes in load resistance, solar array section 205A can exhibit the electrical response illustrated by the curve in chart 300 at a particular radiance and operating temperature. As illustrated in chart 350, the power available from solar array section 205A at any point along the curve illustrated in chart 300 is the product of current and voltage at that point. At any particular temperature and radiance, solar array section 205A has an operating point 365 that results in a maximum power output. In other words, at any particular temperature and radiance, solar array section 205A can be characterized by a load impedance as shown at point 315 that results in the maximum power transfer to a load.

To find this load impedance which corresponds to a maximum power transfer point for solar array section 205A, methods for MPPT can be embodied in an electronic system that can operate solar array section 205A, or other DC power source, in a manner that allows solar array section 205A to produce its maximum power. Such an electronic system can include controller 230A.

Controller 230A can be adapted to control the operating characteristics of converter 220A. In the exemplary embodiment, controller 230A can control certain characteristics of converter 220A to cause its input impedance, as experienced by solar array section 205A, to vary. With this varying impedance, the power provided by solar array section 205A will also vary until the load impedance provided by converter 220A to solar array section 205A corresponds to the maximum power point. It will be appreciated that in adapting controller 230A to provide MPPT optimization, many other MPPT methods can be employed. While only one method is presented here and is associated with modifying certain characteristics of converter 220A, many other methods can be employed in accordance with the teachings of the present invention.

Controller 230A can be implemented using hardware, software, or a combination thereof for performing the functions described herein. By way of example, controller 230A can be a processor, an ASIC, a comparator, a differential module, or other hardware means. Controller 230A can also comprise software or other computer-executable instructions that may be stored in a memory and may be executable by a processor or other processing means.

Through the use of controllers 230A-N in the exemplary embodiment, the maximum power point for each solar array section 205A-N can be obtained. In this way, the power output of the entire solar array, which can comprise multiple solar array sections 205A-N, can be optimized. In conventional system 100, optimization at the level of each solar array section 105A-N is not obtainable. Rather, because conventional converter 115 in system 100 is connected in parallel to a plurality of solar array sections 105, conventional converter 115 can not vary the load impedance provided to individual solar array sections 105 so that the maximum power transfer point for individual sections can be obtained. In other words, conventional system 100 can only provide a single MPPT setpoint for the plurality of solar array sections 105A-N. In embodiments of the invention, a plurality of MPPT setpoints can be provided individually to the plurality of solar array sections 205A-N. By separating the plurality of solar array sections 205A-N into individual sections each with their own MPPT tracking control, the overall utilization and power output of system 200 can be optimized.

In addition to power optimization, providing MPPT for individual solar array sections 105 allows for additional efficiencies. Some of these efficiencies can relate to system wiring 235A-N. At the outset, it will be appreciated that by relocating converters 220A-N and electrically coupling converters 220A-N to individual DC power sources, like solar array sections 205A-N, converters 220A-N can accommodate a smaller power rating. This is partly because a higher voltage and lower current is provided to converters 220A-N when compared to the voltage and current being provided to conventional converter 115 in FIG. 1. Consequently, when lower current is provided to converters 220A-N, smaller gauge wiring 235A-N can electrically couple solar array sections 205A-N to converters 220A-N, which is at least one technical effect of the invention. This leads to another cost reduction in embodiments of the invention since smaller gauge wiring can be less expensive to purchase and install when compared to the larger gauge wiring used in conventional system 100.

By regulating the voltage at the output of converters 220A-N at a level near the wiring voltage capability in the exemplary system and conditioning the voltage nearer to the DC power source as is shown in exemplary system 200, smaller gauge wiring can also be used to electrically couple converters 220A-N to DC-to-AC inverter 225, which can also increase the efficiency of system 200. For instance, in conventional system 100, the wiring 121 between the solar array sections 105A-N and the DC-to-DC converter 120 can be both lengthy and expensive. In solar array sections 105A-N, the output voltage can drop as the output current increases, meaning that the expensive wiring 121, which is expensive partially because of its large gauge, may not be used at its maximum potential. For example, 600 Volt wire can be used to accommodate the maximum output of the multiple parallel-connected solar array sections 105A-N, but at any given point in time, solar array sections 105A-N may only produce 300 Volts of power due to environmental or other conditions.

In exemplary system 200, the DC voltage provided by converters 220A-N can be regulated at approximately 600 Volts and near the maximum power operating point for solar array sections 205A-N. By regulating the DC voltage at 600 Volts in system 200 rather than 300 Volts as provided by conventional system 100, the current provided to DC-to-AC inverter 225 via wiring 226 can be reduced by a factor of two. Consequently, the efficiency of system 200 can be increased because with lower current, there is less power loss associated with wiring 226. In the alternative, the gauge of wiring 226 can be reduced to accommodate the lower current being supplied. Because the wiring 226 can be very lengthy, reducing the size and cost of the wiring 226 by approximately a factor of two can provide a cost savings.

The example elements of FIG. 2 are shown by way of example, and other system and apparatus embodiments can have fewer or greater numbers of elements, and such elements can be arranged in alternative configurations in accordance with other embodiments of the invention.

Figure 4:
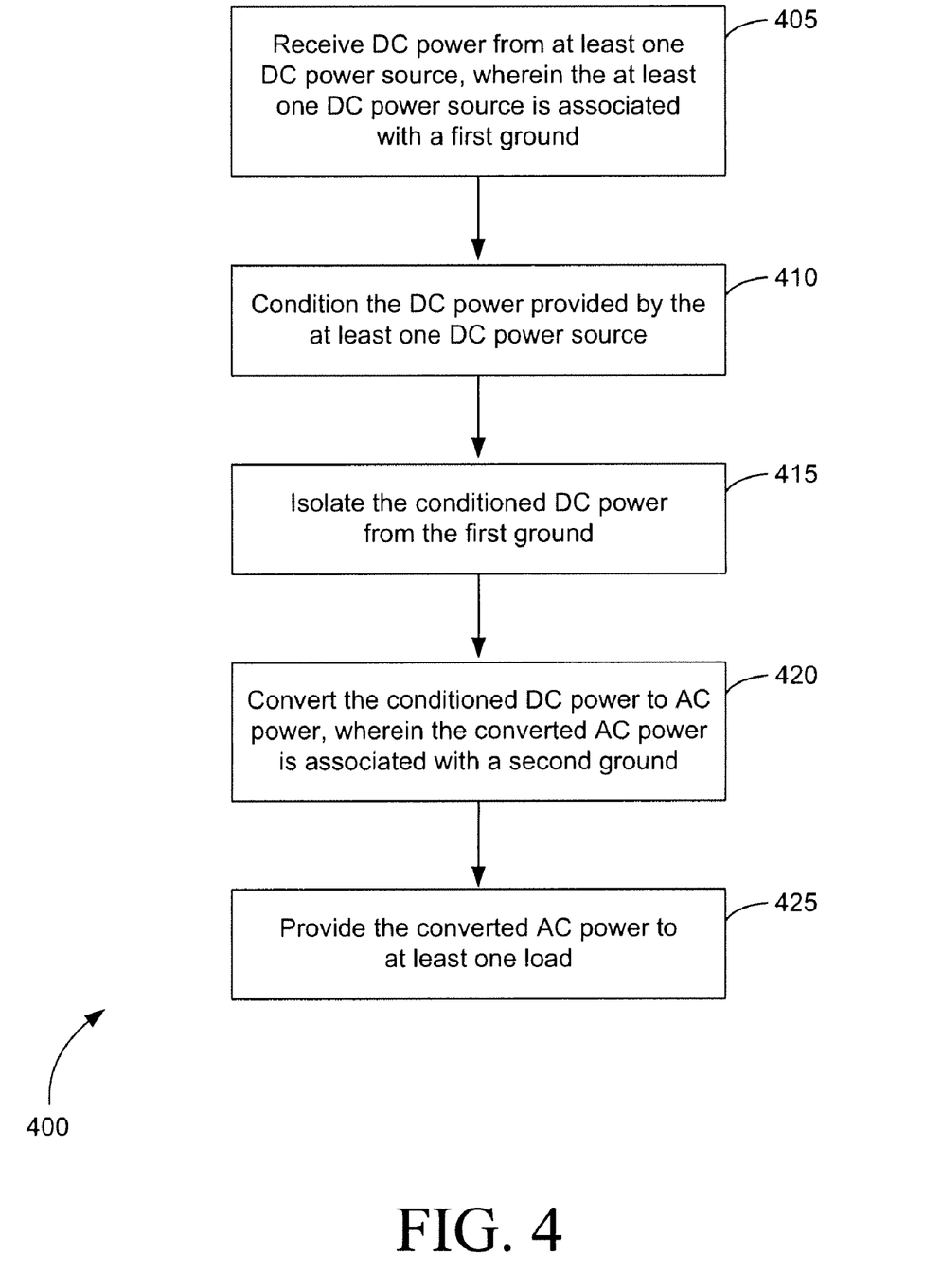
FIG. 4 illustrates an exemplary method for converting DC power to AC power according to one embodiment of the invention.

FIG. 4 illustrates an exemplary method 400 for converting DC power to AC power according to one embodiment of the invention. The method can begin at block 405 where DC power from at least one DC source can be received or otherwise provided. The DC source can include any appropriate DC source including, but not limited to, a battery, a photovoltaic cell, a fuel cell, an array of cells, or the like. Furthermore, the at least one DC source can be associated with a first ground, such as in FIG. 2, where solar array sections 205A-N can be associated with an earth ground.

Method 400 can continue at block 410 where the DC power provided by the at least one DC source can be conditioned. Conditioning can be provided by one or more DC-to-DC converters, such as converters 220A-N in FIG. 2. In some embodiments, conditioning can comprise regulating the DC power being provided by the DC power source, such as with a switching type regulator using some form of pulse width modulation control. In other embodiments, conditioning can include boosting the DC power provided by the DC power source from a first voltage to a second voltage, such as with a step up converter or boost converter.

In other embodiments, conditioning can comprise adjusting the DC power source, or a plurality of DC power sources, to operate at a maximum power point. In one embodiment, conditioning can comprise adjusting a plurality of DC power sources, via a plurality of DC-to-DC converters, to operate at their maximum power point. The plurality of DC-to-DC converters can be electrically coupled in parallel with each other and electrically coupled in series with at least one DC-to-AC inverter, such as displayed in exemplary system 200. Coupled to the plurality of DC-to-DC converters can be one or more controllers, such as controllers 230A-N. The controllers can be operable to adjust the DC power source to its maximum power point, such as by adjusting at least one characteristic of the DC-to-DC converter.

After block 410, method 400 can progress to block 415 where the conditioned DC power can be isolated from the first ground associated with the at least one DC source. Isolating the conditioned DC power from the first ground associated with at least one DC source can be provided by an isolation transformer. To accommodate smaller components, lower costs, and other advantages, the isolation transformer can be adapted to operate at a high frequency greater than 60 Hz. In one embodiment, the isolation transformer can be coupled to a DC-to-DC converter. In another embodiment, the isolation transformer can be adapted as part of a DC-to-DC converter.

At block 420, method 400 can proceed by converting the conditioned DC power to AC power. The converted AC power, being isolated from the first ground associated with the at least one DC source, can be associated with a second ground. In one embodiment, this second ground can be an AC ground associated with a load, such as utility power grid 110 in FIG. 1. In the exemplary embodiment, converting the conditioned DC power to AC power at block 420 can be provided by DC-to-AC inverter 225 in FIG. 2.

Method 400 continues to block 425 where the converted AC power can be provided to a least one load. While the preceding discussion has referenced the load as being associated with utility power grid 210, it will be appreciated that other types of loads can also be provided power. Exemplary loads can include switches, power inverters, motors, and the like.

The example elements of FIG. 4 are shown by way of example, and other process embodiments can have fewer or greater numbers of elements, and such elements can be arranged in alternative configurations in accordance with other embodiments of the invention.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for converting direct current (DC) power to alternating current (AC), the method comprising:
   receiving DC power from at least one DC power source, wherein the at least one DC power source is associated with a first ground;
   conditioning the DC power provided by the at least one DC power source by at least one DC-to-DC converter;
   varying the impedance provided by the at least one DC-to-DC converter to the at least one DC power source responsive to at least one command from at least one controller until the load impedance provided by the at least one DC-to-DC converter to the at least one DC power source corresponds to a maximum power point for the at least one DC power source;
   isolating the conditioned DC power from the first ground by the at least one DC-to-DC converter, wherein an isolating transformer is coupled to the at least one DC-to-DC converter;
   converting the conditioned DC power to AC power by at least one inverter physically separated from the at least one DC-to-DC converter, wherein the converted AC power is associated with a second ground; and
   providing the converted AC power associated with a second ground to at least one load associated with the second ground.

2. The method of claim 1, wherein the at least one DC power source comprises at least one of the following: a photovoltaic cell, a fuel cell, or a battery.

3. The method of claim 1, wherein conditioning comprises adjusting the at least one DC-to-DC converter to cause the at least one source of DC power to operate at a maximum power point for the at least one source of DC power.

4. The method of claim 1, wherein isolating the conditioned DC power from the first ground comprises isolating the conditioned DC power from the first ground at a high frequency.

5. The method of claim 1, wherein conditioning the DC power provided by the at least one DC power source comprises boosting the DC power from a first voltage to a second voltage.

6. The method of claim 1, further comprising adjusting an impedance of the at least one DC-to-DC converter experienced by the at least one source of DC power to cause the at least one source of DC power to adjust its power output.

7. The method of claim 1, wherein the at least one DC-to-DC converter comprises a plurality of DC-to-DC converters electrically coupled in parallel with the at least one inverter, and wherein each of the plurality of DC-to-DC converters is electrically coupled to a different DC power source.

8. A system for converting DC power to AC power, the system comprising:
   at least one DC-to-DC converter electrically coupled to at least one source of DC power, wherein the at least one DC-to-DC converter is operable to condition the DC power provided by the at least one source of DC power and is further operable to isolate the conditioned DC power from the first ground, wherein an isolating transformer is coupled to the at least one DC-to-DC converter;
   at least one controller operable to adjust the at least one DC-to-DC converter to vary a load impedance provided by the at least one DC-to-DC converter to the at least one DC power source until the load impedance provided by the at least one DC-to-DC converter to the at least one DC power source corresponds to a maximum power point for the at least one DC power source;
   at least one inverter electrically coupled to the at least one DC-to-DC converter, wherein the at least one inverter is physically separated from the at least one DC-to-DC converter, and wherein the inverter is operable to convert the conditioned DC power isolated from the first ground to AC power associated with a second ground; and
   at least one load electrically coupled to the at least one inverter and associated with the second ground, wherein the at least one load is operable to receive the converted AC power.

9. The system of claim 8, wherein the at least one source of DC power comprises at least one of the following: a photovoltaic cell, fuel cell, or a battery.

10. The system of claim 8, wherein the at least one DC-to-DC converter is further operable to isolate the conditioned DC power from the first ground at a high frequency.

11. The system of claim 8, wherein the at least one DC-to-DC converter is further operable boost the DC power from the at least one source of DC power from a first voltage to a second voltage.

12. The system of claim 8, wherein the at least one DC-to-DC converter comprises a plurality of DC-to-DC converters electrically coupled in parallel with the at least one inverter, wherein each of the plurality of DC-to-DC converters is electrically coupled to a different source of DC power.

13. The system of claim 8, further comprising at least one controller operable to adjust an impedance of the at least one DC-to-DC converter experienced by the source of DC power to cause the source of DC power to adjust its power output.

14. An apparatus for converting DC power to AC power, the apparatus comprising:
   at least one DC-to-DC converter electrically coupled to a source of DC power, wherein the at least one DC-to-DC converter is operable to condition the DC power provided by a source of DC power with a first ground and is further operable to isolate the conditioned DC power from the first ground, wherein an isolating transformer is coupled to the at least one DC-to-DC converter;
   at least one controller operable to adjust the at least one DC-to-DC converter to vary a load impedance provided by the at least one DC-to-DC converter to the at least one DC power source until the load impedance provided by the at least one DC-to-DC converter to the at least one DC power source corresponds to a maximum power point for the at least one DC power source; and
   at least one inverter electrically coupled to the at least one DC-to-DC converter, wherein the at least one inverter is physically separated from the at least one DC-to-DC converter, and wherein the inverter is operable to convert the conditioned DC power isolated from the first ground to AC power associated with a second ground.

15. The apparatus of claim 14, wherein the source of DC power comprises at least one of the following: a photovoltaic cell, a fuel cell, or a battery.

16. The apparatus of claim 14, wherein the at least one DC-to-DC converter is further operable to isolate the conditioned DC power from the first ground at a high frequency.

17. The apparatus of claim 14, further comprising at least one controller operable to adjust an impedance of the at least one DC-to-DC converter experienced by the source of DC power to cause the source of DC power to adjust its power output.

18. The apparatus of claim 14, wherein the at least one DC-to-DC converter comprises a plurality of DC-to-DC converters electrically coupled in parallel with the at least one inverter, and wherein each of the plurality of DC-to-DC converters is electrically coupled to a different source of DC power.

* * * * *